United States Patent
Klaasen et al.

(10) Patent No.: US 6,969,859 B2
(45) Date of Patent: Nov. 29, 2005

(54) RADIATION DETECTING SYSTEM

(75) Inventors: William A. Klaasen, Underhill, VT (US); Edward J. Nowak, Essex Junction, VT (US); Norman J. Rohrer, Underhill, VT (US)

(73) Assignee: International Business Machines Corporation, Armonk, NY (US)

( * ) Notice: Subject to any disclaimer, the term of this patent is extended or adjusted under 35 U.S.C. 154(b) by 152 days.

(21) Appl. No.: 10/249,872

(22) Filed: May 14, 2003

(65) Prior Publication Data

US 2004/0227093 A1 Nov. 18, 2004

(51) Int. Cl.[7] .............................................. G01T 1/24
(52) U.S. Cl. ............................................. 250/370.01
(58) Field of Search ................... 250/370.01; 378/97, 378/98.7, 108

(56) References Cited

U.S. PATENT DOCUMENTS

| | | | |
|---|---|---|---|
| 3,654,468 A | 4/1972 | Shah | 250/83.3 R |
| 3,987,319 A | 10/1976 | Nirschl | 307/311 |
| 4,845,771 A * | 7/1989 | Wislocki et al. | 378/97 |
| 4,976,266 A | 12/1990 | Huffman et al. | 128/659 |
| 5,107,139 A * | 4/1992 | Houston et al. | 327/18 |
| 5,739,541 A | 4/1998 | Kahilainen | 250/370.07 |
| 5,898,711 A * | 4/1999 | Buer | 714/800 |
| 2001/0032933 A1 | 10/2001 | Thomson et al. | 250/370.01 |

* cited by examiner

Primary Examiner—Constantine Hannaher
Assistant Examiner—Marcus Taningco
(74) Attorney, Agent, or Firm—Richard A. Henkler; Hoffman, Warnick & D'Alessandro LLC

(57) ABSTRACT

A radiation detecting system including a radiation detecting section having one or more radiation detecting circuits and a circuit adjustment section for adjusting other circuitry to be protected. Radiation detecting circuits are provided to detect a pulse of radiation and/or a total radiation dose accumulation.

13 Claims, 4 Drawing Sheets

RADIATION DETECTING SYSTEM

BACKGROUND OF INVENTION

1. Technical Field

The present invention relates generally to radiation detecting, and more particularly, to a radiation detecting system.

2. Related Art

Radiation can cause integrated circuits (IC) to malfunction. Radiation malfunction can occur due to pulse type radiation or radiation dose accumulation over a period of time. While a variety of radiation detection systems exists, no adequate provisions exist for detecting radiation and then protecting against its effects on other circuitry, e.g., a critical processor.

In view of the foregoing, there is a need for a radiation detecting system for detecting radiation and adjusting other circuitry to be protected.

SUMMARY OF INVENTION

A radiation detecting system including a radiation detecting section having one or more radiation detecting circuits and a circuit adjustment section for adjusting other circuitry to be protected. Radiation detecting circuits are provided to detect a pulse of radiation and/or a total radiation dose accumulation.

A first aspect of the invention includes a radiation detecting system comprising: a radiation detecting section for detecting radiation; and a circuit adjustment section for adjusting other circuitry in response to a radiation detecting indication from the radiation detecting section.

A second aspect of the invention includes a radiation detecting system comprising: a radiation detecting section including: at least one detecting node set to a first state, and a radiation sensitive component coupled to each detecting node for changing the state of the detecting node to a second state in response to sensing radiation; and a circuit adjustment section for adjusting other circuitry in response to the change in state.

A third aspect of the invention includes a radiation detecting system comprising: means for detecting radiation; and means for adjusting other circuitry in response to a radiation detection from the means for detecting.

foregoing and other features of the invention will be apparent from the following more particular description of embodiments of the invention.

BRIEF DESCRIPTION OF DRAWINGS

The embodiments of this invention will be described in detail, with reference to the following figures, wherein like designations denote like elements, and wherein.

DETAILED DESCRIPTION

For purposes of description clarity only, the disclosure includes the following subtitles: I. Radiation Detecting System, II. Pulse Radiation Detecting Circuit, III. Total Radiation Dose Accumulation Detecting Circuit, and IV. Conclusion.

I. Radiation Detecting System

Figure 1:
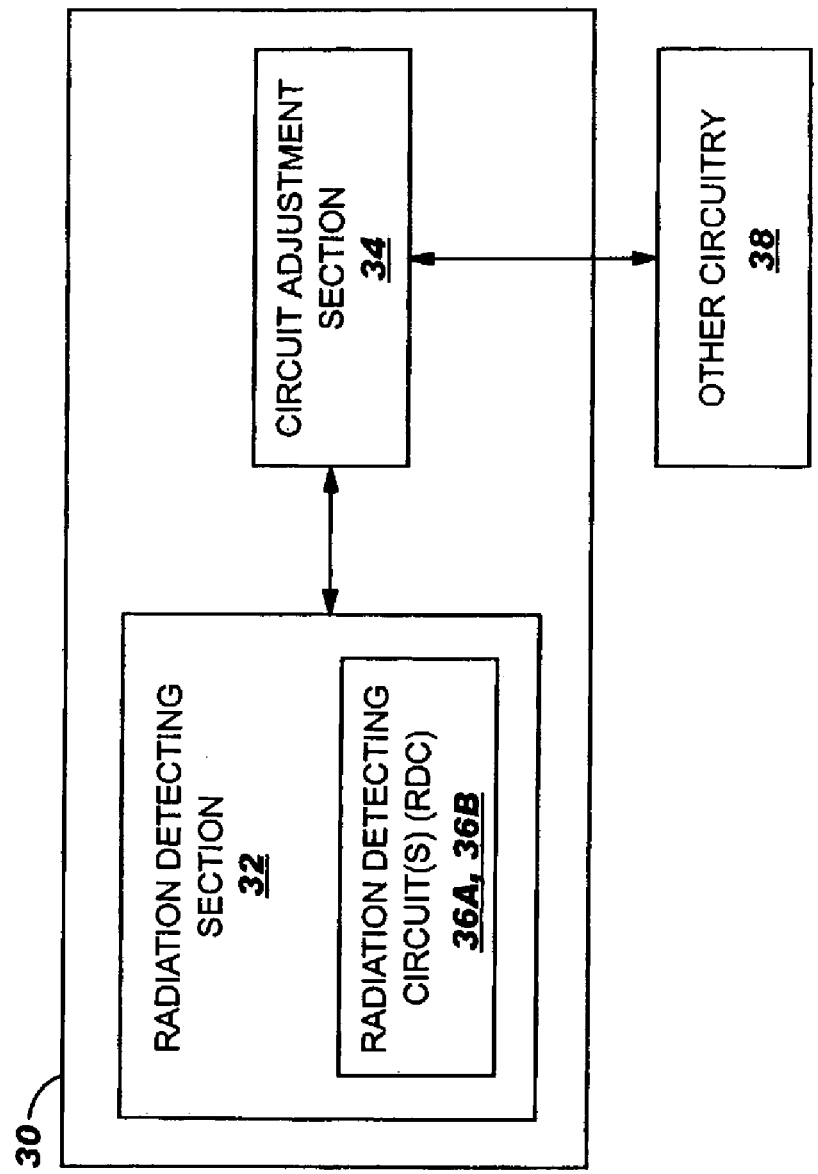
FIG. 1 shows a radiation detecting system of the invention.

Referring to FIG. 1, the invention includes a radiation detecting system 30 including a radiation detecting section 32 and a circuit adjustment section 34. Radiation detecting section 32 includes one or more radiation detecting circuits 36A, 36B, described below. Circuit adjustment section 34 may include any now known or later developed mechanisms for taking the outputs of one or more of radiation detecting circuits 36A, 36B and adjusting other circuitry 38. "Adjustment" may include changing feature(s) of other circuitry 38 and/or disabling feature(s) of other circuitry 38. "Other circuitry" 38 can be any circuitry considered by a designer necessary of protection against radiation malfunction. For example, other circuitry 38 could be a mission critical processor, memory, PLL, etc.

II. Pulse Radiation Detecting Circuit

Figure 2:
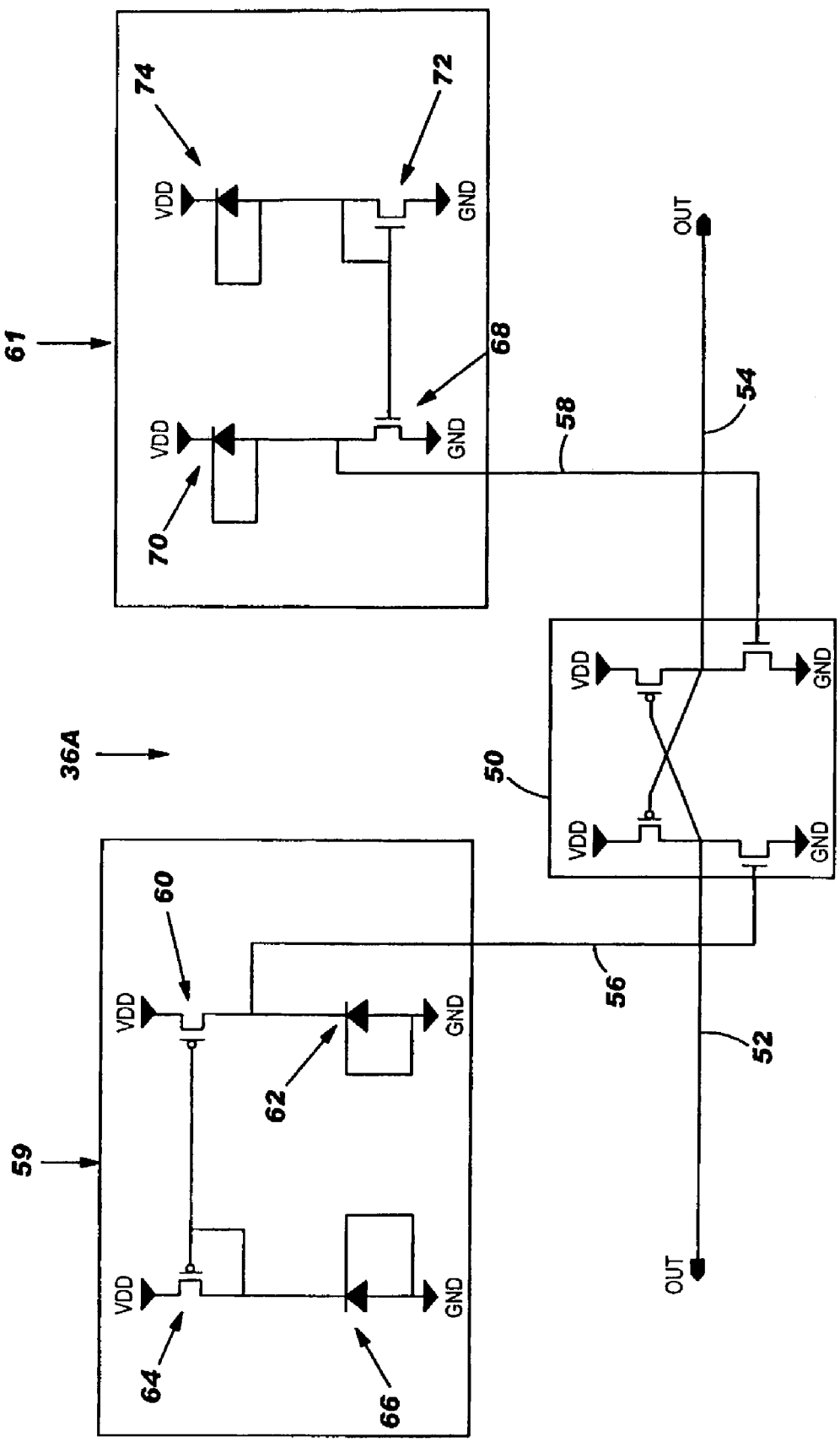
FIG. 2 shows a first embodiment of a circuit for detecting a pulse of radiation.

Referring to FIG. 2, a first embodiment of a radiation detecting circuit 36A is shown. In this case, radiation detecting circuit 36A (hereinafter "RDC") detects a pulse of radiation. RDC 36A includes a differential amplifier 50 having a first out node (left) 52, a second out node (right) 54, a first detecting portion (left) 59 and a second detecting portion (right) 61. First out node 52 and second out node 54 are fed to circuit adjustment section 34 (FIG. 1). Since, the details of differential amplifier 50 are well known in the art, the details and functioning of it will not be described.

First detecting portion 59 includes a first detecting node (left) 56, and a first PFET 60 drain and a first reversed bias diode 62 coupled to first detecting node 56. First PFET 60 has its source coupled to VDD. First reversed biased diode 62 is connected to ground (GND), and is off. As a result, first PFET 60 initially sets first detecting node 56 HIGH. Similarly, second detecting portion 61 includes a second detecting node (right) 58, and a first NFET 68 and a second reversed biased diode 70 coupled to second detecting node 58. In this case, however, first NFET 68 has its source coupled to ground (GND), and second reversed biased diode 70 is connected to VDD. As a result, second detecting node 58 is initially set LOW.

Optionally, first detecting portion 59 may also include a duplication of first PFET 60 and first reversed bias diode 62 to assist pulling first detecting node 56 HIGH and recovery of that setting after a radiation pulse. In particular, first PFET's 60 gate node may be connected to a gate and drain of a second PFET 64 and a third reversed bias diode 66. Second PFET 64 has its source coupled to VDD and its drain coupled to third reversed biased diode 66, which is coupled to ground (GND). If first PFET 60 and first reversed biased diode 62 are not duplicated, then the gate of first PFET 60 would be connected to a suitable circuit (not shown) to bias first PFET 60 into conduction that is sufficient to maintain a voltage drop across first reversed biased diode 62 of greater than one half of VDD (VDD/2). Similarly, second detecting portion 61 may also include a duplication of first NFET 68 and second reversed bias diode 70 to assist pulling second detecting node 58 LOW and recovery of that setting after a radiation pulse. In this case, first NFET 68 has its gate connected to a gate and drain of a second NFET 72, and a fourth reversed biased diode 74. Fourth reversed biased diode 74 is connected to VDD. If first NFET 68 and second reversed biased diode 70 are not duplicated, then the gate of first NFET 68 would be connected to a suitable circuit (not shown) designed to bias first NFET 68 into conduction that is sufficient to maintain a voltage drop across second reversed biased diode 70 of less than half VDD (VDD/2).

In one embodiment, each of PFETs 60, 64 and NFETs 68, 72 are of substantially the same size, as are each of diodes 62, 66, 70, 74 such that the above structure provides a balance of forward device current and reverse bias diodes feeding differential amplifier 50. Each diode 62, 66, 70, 74 is preferably a PIN diode that provides a large generation and collection portion for radiation-induced charge.

In operation, as noted above, first detecting node 56 is initially set HIGH and second detecting node 58 is initially set LOW. In addition, first out node 52 is set LOW and second out node 54 is set HIGH. During a pulse of radiation, however, an electron pair hole (eph) is generated across the diffusion junction of any number of diode(s) 62, 66, 70, 74. When the eph is generated, a current will flow across diode(s) 62, 66, 70, 74, causing it/them to act as a limited short. As a result, diodes 62, 66 short causing PFETs 60, 64 to be pulled to ground (logic 0) and, accordingly, first detecting node 56 to also be pulled LOW. In contrast, shorting of diodes 70, 74 cause NFETs 68, 72 to be pulled HIGH and, accordingly, second detecting node 58 to be pulled HIGH. Hence, PFETs 60, 64, NFETs 68, 72 and diodes 62, 66, 70, 74 act as a radiation sensitive component. The overall result is that during a radiation pulse, the states of first detecting node 56 and second detecting node 58 are switched. That is, first detecting node 56 switches from HIGH to LOW, and second detecting node 58 switches from LOW to HIGH. As a further consequence, first out node 52 switches from LOW to HIGH, and second out node 54 switches from HIGH to LOW. The switch in out nodes 52, 54 indicates to circuit adjustment section 34 (FIG. 1), that other circuitry 38 should be adjusted. Similarly, when the radiation pulse is over and the outputs again switch, this may indicate to circuit adjustment section 34 that other circuitry 38 may be re-adjusted.

In one embodiment, the width of the pulse current may be greater than approximately 10 ns, and RDC 36A may be sized to create a current pulse greater than approximately 0.32 nA. A larger current is preferred to assist with the detection of the radiation. The provision of two detecting portions 59, 61 provides the ability to detect two signal changes, rather than requiring a single signal change from rail to rail (VDD to ground or vice versa). Hence, RDC 36A is more sensitive to a radiation pulse. The detecting nodes 56, 58 do not need to drive completely to the rail as the differential voltage from the left side to the right side only needs to cross each other.

Figure 3:
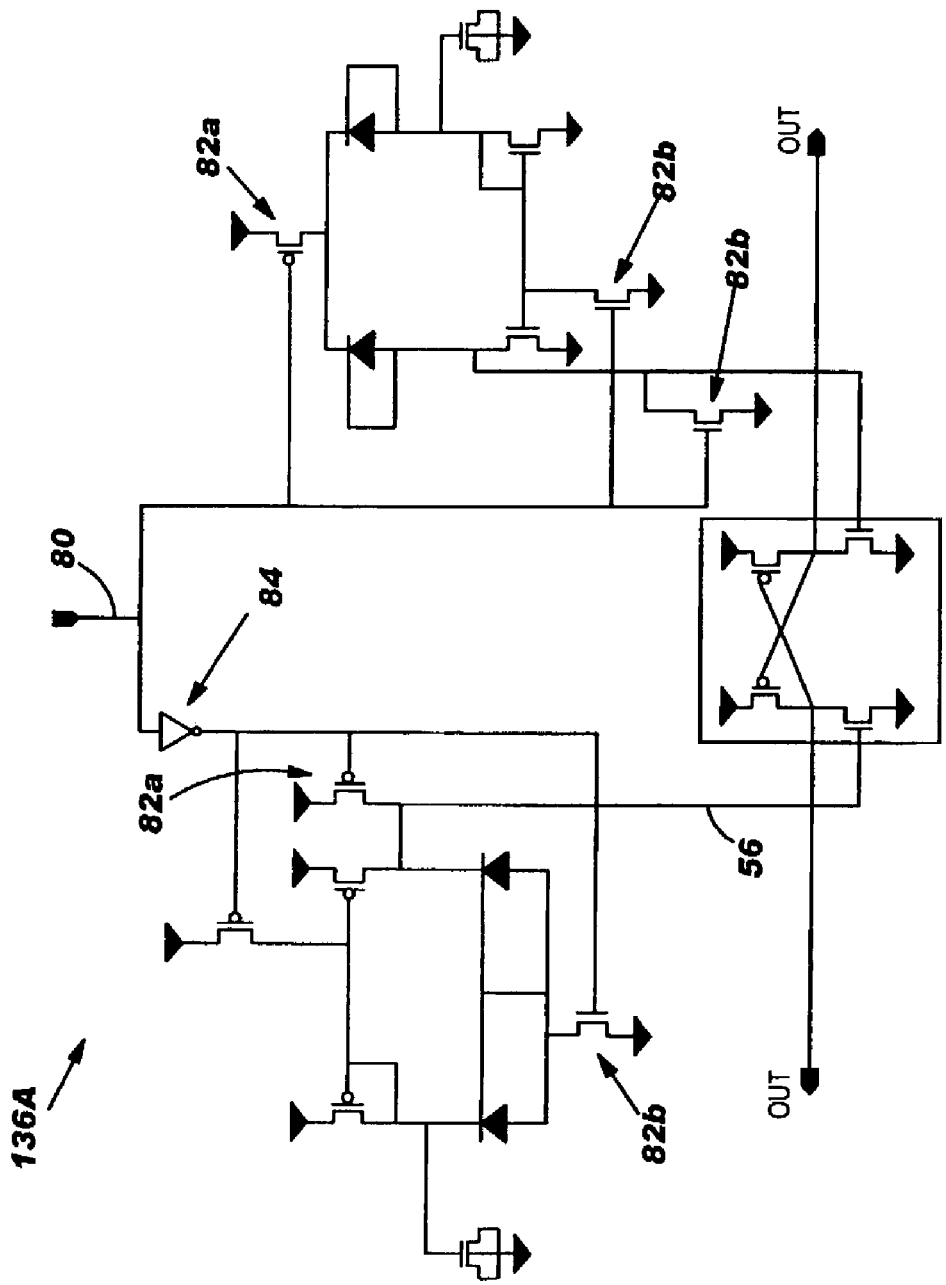
FIG. 3 shows an alternative first embodiment of a circuit for detecting a pulse of radiation.

Referring to FIG. 3, an alternative embodiment to RDC 136A is shown. This embodiment is substantially similar to that of FIG. 2, except that a control signal 80 is provided for the entire RDC 136A. Control signal 80 feeds a number of disable PFETs 82a and a number of disable NFETS 82b for turning current off to RDC 136A. An inverter 84 is provided for first detecting node 56. In operation, when control signal 80 is LOW, disable FETs 82a, 82b turn off RDC 36A.

III. Total Radiation Dose Accumulation Detecting Circuit

Figure 4:
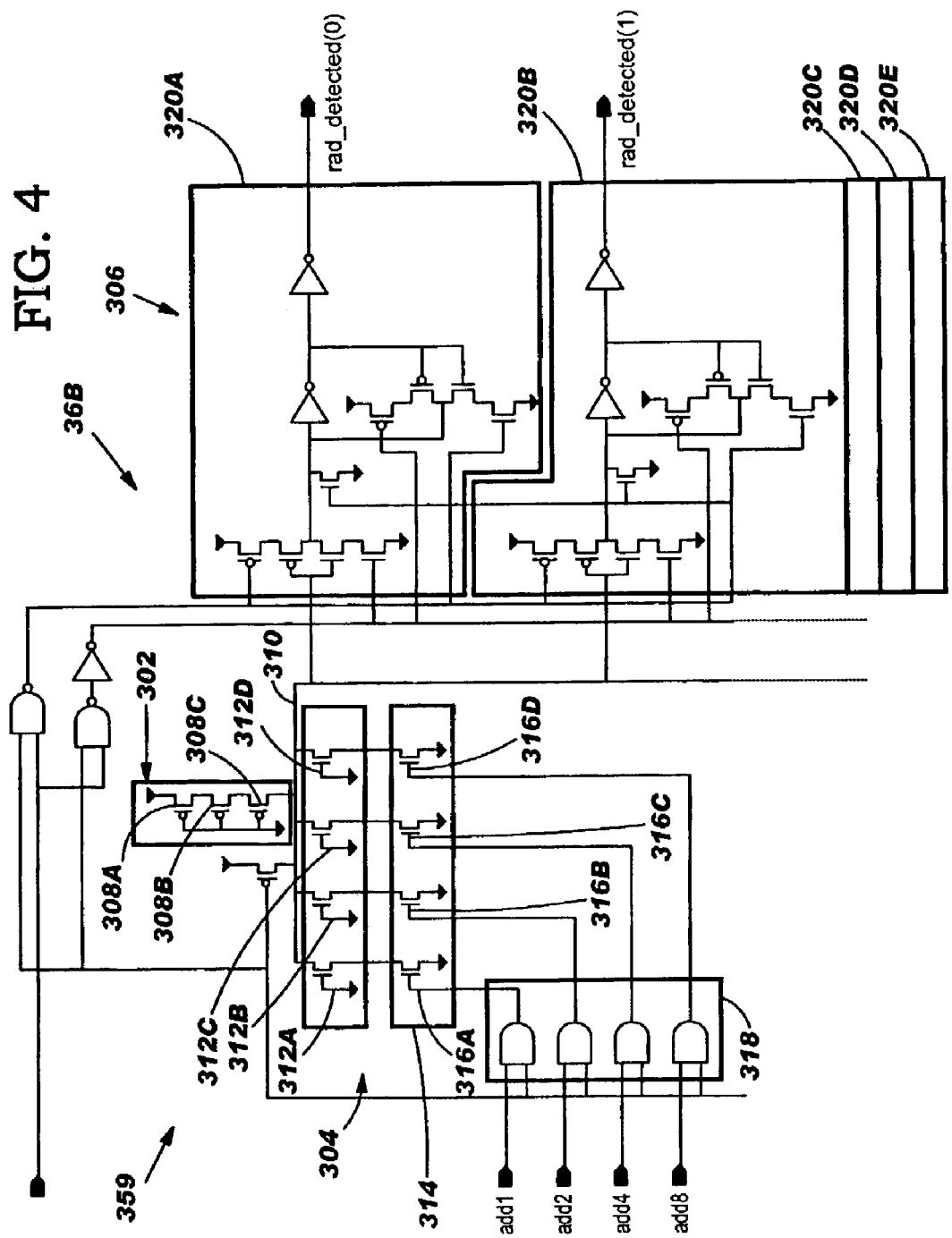
FIG. 4 shows a second embodiment of a circuit for detecting a total dose of radiation.

Referring to FIG. 4, a radiation detecting circuit (RDC) 36B according to a second embodiment is shown. This RDC 36B detects a total radiation dose accumulation as sensed by a shift in threshold voltage of a transistor, which results in a change in leakage current. In one example, a minimal amount of total radiation dose accumulation to be detected may be >500 kRad.

RDC 36B includes a detecting portion 359 including a detecting node 310, a PFET section 302, an NFET section 304 and a tristate inverter section 306 coupled to detecting node 310. PFET section 302 includes a PFET 308A coupled to VDD. In one embodiment, however, a series of three PFETs 308A, 308B, 308C coupled in series are used to provide a very weak pullup to VDD. It should be recognized, however, that any number of PFETs may be provided, including one. Each of PFETs 308A, 308B, 308C have their gates connected to GND. PFET 308A has its source connected to VDD and its drain connected to the source of PFET 308B. PFET 308B has its drain connected to the source of PFET 308C, and PFET 308C has its drain coupled to detecting node 310. Detecting node 310 is connected to a drain of NFET section 304.

NFET section 304 may include one or more NFETs 312. For purposes of initial description, only NFET 312A will be described. NFET 312A has its gate connected to ground (off). In one example, NFET 312A may have a size width of 400 um. However, other sizes are also possible. NFET 312A is coupled to a control gate section 314, which includes a control FET 316A. Control FET 316A is connected to control logic 318 for determining when to enable control FET 316A. Since the structure of control logic 318 is not imperative to the invention, details thereof will not be described.

Tristate inverter section 306 includes one or more tristate inverters 320. For purposes of initial description, only inverter 320A will be described. Since the structure of a tristate inverter 320A is conventional, the details of this device will not be described in further detail. An output of tristate inverters 320A is coupled to circuit adjustment section 34 (FIG. 2).

In operation, PFETs 308A–C are initially on and balanced by the leakage current of NFET 312A, which is off. Accordingly, PFETs 308A–C pull detecting node 310 HIGH. As the total radiation dose in the IC accumulates, the threshold voltage Vt begins to shift, which results in NFET 312A becoming increasingly leaky. At some point, enough radiation accumulates that NFET 312A leaks sufficient current to drain PFETs 308A–C. When this occurs, detecting node 310 is pulled LOW. Hence, PFET section 302 and NFET section 304 provide a radiation sensitive component. Tristate inverter 320A is set to trigger when detecting node 310 reaches a certain LOW state, and output a radiation detecting signal (rad_detected(0)). When radiation detecting signal (rad_detected(0)) is HIGH, circuit adjustment section 34 (FIG. 2) adjusts other circuitry 38 (FIG. 2) accordingly. The amount of accumulated radiation required to trigger NFET 312A is determined by the size of NFET 312A and, hence, can be user selected. Similarly, the state of detecting node 310 required to trigger tristate inverter 320A can also be user selected.

With continuing reference to FIG. 4, NFET section 304 may also include more than one NFET 312A–D such that each NFET can provide a different level of total radiation dose accumulation sensitivity determined by their respective size. As illustrated, four NFETs 312A, 312B, 312C, 312D, each of a different size, are shown. In one example, the sizes of the NFETs include: 400 um—312A, 2400 um—312B, 12,300 um—312C, and 60,000 um—312D. Accordingly, each NFET 312A–D trips at a different level of accumulated radiation. The range and sizes of NFETs 312A–D can be user selected to correspond to desired radiation accumulation. Each NFET's 312A–D source is connected to control gate section 314, which includes a control FET 316A–D for each NFET 312A–D. Control FETs 316A–D are connected to control logic 318 for determining when to activate control FETs 316A–D. Again, since the structure of control logic 318 is not imperative to the invention, details thereof will not be described. However, a user can define what total radiation dose accumulation(s) is/are required to cause a detecting by turning on a selected one or ones of NFETs 312A–D.

The above-described NFET section 304 provides a user with flexibility to make adjustments to other circuitry 38

(FIG. 1) based on differing amount of total radiation dose accumulation. For instance, a user may activate NFET 312D via control FET 316D to detect a first amount of radiation accumulation that requires adjustment of other circuitry 38 (FIG. 1). Once radiation detecting with NFET 312D has been made, NFET 312D may be deactivated via control FET 316D, and NFET 312C may be activated via control FET 316C to detect a second, larger amount of total radiation dose accumulation that requires further adjustment or disabling of other circuitry 38 (FIG. 2). In this fashion, any number of different radiation accumulations may be detected and a corresponding variety of adjustments to other circuitry 38 (FIG. 1) made.

As also illustrated in FIG. 4, more than one identical tristate inverter 320A, 320B, 320C, 320D and 320E may be provided. Each inverter outputs a radiation detecting indication (rad_detected(x) where x is an integer) when triggered. Further, each tristate inverter 320A–E provides a different level of sensitivity to the state of detecting node 310, i.e., the amount of drainage to detecting node 310. In this fashion, a user can further define what radiation accumulation(s) is/are required to cause a detection by turning on a selected one or ones of tristate inverters 320A–E. For instance, rad_detected(0) may detect a least amount of radiation, rad_detected (1), rad_detected(2), rad_detected (3) gradually higher levels, and rad_detected(4) a highest level of radiation. Multiple tristate inverters 320A–E may be used where one NFET 312 is used, or where more than on NFET 312A–D is used. In the latter case, multiple tristate inverters can provide further flexibility by allowing total radiation dose accumulation detections within a range that is between the sensitivities of NFETS 312A–D. In order to enable this functionality, in one embodiment, tristate inverters 320A–E may have P-N ratios of 20-1, 5-1, 2-1, 1-5 and 1-20, respectively,.

In an alternative embodiment, instead of using regular pull-down devices (i.e., NFETs 312), zero Vt devices could also be used. In this case, the zero Vt devices could be used with n-well implants for the source/drain regions in order to maximize the efficiency of detection of radiation.

As another alternative embodiment, other safety control circuitry (not shown) may also be provided to prevent glitches from, for example, alpha particles, causing a false detection. For instance, circuitry can be provided to test for radiation at some number of cycles apart, e.g., 256, to insure that radiation detection is constant.

IV. Conclusion

The above-described radiation detecting circuits 36A, 36B may used individually or in combination.

While this invention has been described in conjunction with the specific embodiments outlined above, it is evident that many alternatives, modifications and variations will be apparent to those skilled in the art. Accordingly, the embodiments of the invention as set forth above are intended to be illustrative, not limiting. Various changes may be made without departing from the spirit and scope of the invention as defined in the following claims.

What is claimed is:

1. A radiation detecting system comprising:
   a radiation detecting section for detecting total radiation dose accumulation, the radiation detecting section including a detecting portion having:
      a detecting node coupled to a PFET section that is coupled to VDD, and an NFET section that is coupled to ground; and
      a tristate inverter coupled to the detecting node to output a radiation detecting indication when the radiation accumulation causes the NFET section to drain the detecting node to a point sufficient to trigger the tristate inverter; and
   a circuit adjustment section for adjusting other circuitry in response to a radiation detecting indication from the radiation detecting section.

2. The system of claim 1, wherein the NFET section includes a plurality of NFETs, and the tristate inverter section includes a plurality of tristate inverters.

3. The system of claim 2, wherein each NFET and each tristate inverter is responsive to a different accumulation of radiation.

4. A radiation detecting system comprising:
   a radiation detecting section including:
      a first detecting node set to a first state, and a second detecting node set to a first state, and
      a radiation sensitive component coupled to each detecting node for changing the first state of the respective detecting node to a second state in response to sensing radiation;
   wherein the radiation sensitive component coupled to the first detecting node includes a first PFET and a first reversed biased diode, the first PFET being coupled to VDD and the first reversed biased diode being coupled to ground;
   wherein the radiation sensitive component coupled to the second detecting node includes a first NFET and a second reversed biased diode, the first NFET being coupled to ground and the second reversed biased diode being coupled to VDD; and
   a circuit adjustment section for adjusting other circuitry in response to the change in state.

5. The system of claim 4, wherein the radiation is a pulse.

6. The system of claim 5, wherein the pulse of radiation has a width of greater than approximately 10 nS.

7. The system of claim 5, wherein the pulse of radiation has a current of greater than approximately 0.32 nA.

8. The system of claim 4, wherein the detecting nodes are coupled together by a differential amplifier.

9. The system of claim 8, wherein:
   the radiation sensitive component coupled to the first detecting node further includes a second PFET coupled to VDD, the first PFET and a third reversed biased diode, the third reversed biased diode being coupled to ground; and
   the radiation sensitive component coupled to the second detecting node further includes a second NFET coupled to ground, the first NFET and a fourth reversed biased diode, the fourth reversed biased diode being coupled to VDD.

10. The system of claim 4, wherein the radiation sensitive component includes at least one PFET coupled to VDD and to at least one detecting node and at least one NFET coupled to ground and to at least one detecting node.

11. The system of claim 10, wherein the at least one NFET includes a plurality of NFETs each having a different total radiation dose accumulation sensitivity.

12. The system of claim 10, further comprising at least one tristate inverter coupled to the detecting node for outputting a radiation detected indication.

13. The system of claim 12, wherein the at least one tristate inverter includes a plurality of tristate inverters each having a different trigger sensitivity.

* * * * *